No. 714,466. Patented Nov. 25, 1902.
S. FADER.
KNOB ATTACHMENT.
(Application filed July 23, 1902.)
(No Model.)
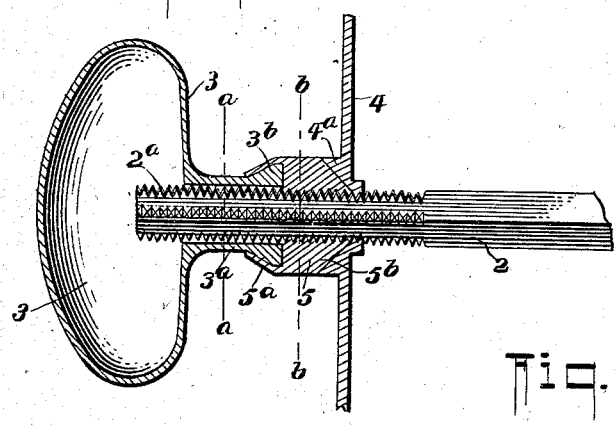
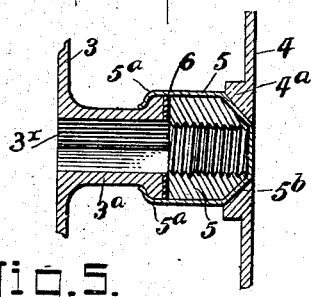
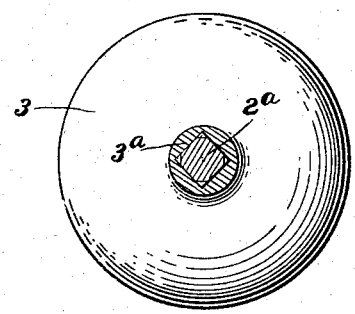
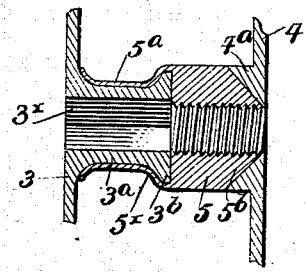
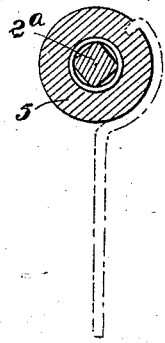
WITNESSES:
INVENTOR
Silas Fader
BY
Fred G. Dieterich
ATTORNEY

UNITED STATES PATENT OFFICE.

SILAS FADER, OF VANCOUVER, CANADA.

KNOB ATTACHMENT.

SPECIFICATION forming part of Letters Patent No. 714,466, dated November 25, 1902.

Application filed July 23, 1902. Serial No. 116,685. (No model.)

*To all whom it may concern:*

Be it known that I, SILAS FADER, a citizen of the Dominion of Canada, residing at Vancouver, in the Province of British Columbia, Canada, have invented a new and useful Door-Handle Attachment, of which the following is a specification.

My present invention is in the nature of an improved door-knob attachment; and it seeks to provide a simple and economical construction of parts capable of being easily adjusted for obtaining a close and accurate fitting of the knob and spindle members; and the said invention consists in certain details of construction and novel combinations of parts, all of which will hereinafter be fully explained, and specifically pointed out in the appended claims, reference being had to the accompanying drawings, in which—

Figure 1 is a longitudinal section of my door-knob attachment. Fig. 2 is a cross-section thereof on the line $a\,a$ of Fig. 1. Fig. 3 is a similar view on the line $b\,b$ of Fig. 1. Fig. 4 is a detail longitudinal section of a modified form of the nut and knob-neck connection, and Fig. 5 is a similar view of a further modification hereinafter referred to.

In the drawings, 2 designates the knob-spindle, square in cross-section; 3, the knob, which has a neck or hub portion $3^a$, and 4 the door-plate, which is secured in the usual manner and provided with a conical bearing-surface $4^a$ surrounding its spindle-aperture, as shown.

The outer end of the spindle is threaded at its corners only, as indicated by $2^a$, whereby to retain the flat surfaces of its sides to coact with the opposing flat sides of the socket $3^\times$ in the knob-neck, which is freely slidable on the outer threaded portion of the spindle.

5 designates a nut for rigidly holding the knob with the spindle and for effecting a close and accurate adjustment of the knob and spindle. At one end of the nut 5 is a conical bearing-surface $5^b$ for engaging with the conical bearing on the plate 4, and at its outer end it has an extension adapted to extend over the knob-neck, the reason for which will presently appear.

The end of the neck in the simplest form of my invention, as shown in Fig. 1, has an annular flange $3^b$, the inner wall of which is beveled, as shown, and in the practical adjustment of the nut on the knob-neck the extension of the nut, which in the form shown in Fig. 1 is in the nature of an annular band, is fitted over the flange $3^b$ and is beaded or compressed thereon in frictional contact therewith, whereby to join the nut 5 with the neck and hold the same in axial alinement with the neck $3^a$ of the knob.

The thread of the nut 5 is designed to snugly coact with the threads on the spindle 2, and the band portion $5^a$ secures the nut to the knob in such manner that under the initial fitting or starting of the nut on the spindle the same turns with the knob as a fixed portion thereof, and under a wrench action it will rotate on the knob-neck for the purpose presently explained.
So far as described the manner in which my attachments are operably adjusted is as follows: The nut 5 is entered on the threaded end of the spindle 2 and is screwed upon said spindle by turning the knob until the outer end of the spindle reaches the socket portion $3^\times$ of the knob-neck. The nut is then screwed home to a close and accurate fit by wrench or lever power sufficient to rotate the nut on the knob-neck until the spindle is drawn out sufficient to effect a close engagement of the conical bearing-faces of the nut and the plate 4. The nut in its final adjustment may be turned by any suitable wrench or clamping-pliers; but to provide a simple means and sufficiently inexpensive to admit of the same being supplied with each set of knobs I prefer to use a type of wrench indicated in dotted lines in Fig. 3, the nut having a socket to receive the grip-fingers thereof, as shown. The particular form of the opposing faces of the knob-neck and the nut to provide the frictional contacting thereof, as hereinbefore explained, may be varied or modified from what is shown in Fig. 1. For instance, the member $3^b$ of the knob-neck may be in the nature of an abrupt annular head, as shown in Fig. 4, against which the end of the band $5^a$ may be compressed or tightly beaded in any well-known manner to hold the nut and the knob together under ordinary conditions. In the construction shown in Fig. 4 the band $5^a$ is shown as a separate member on the nut.

In Fig. 5 the same construction of parts is shown as in Fig. 1, except the clamping extension 5ª is shown as continued from its frictionally engaged portion to form a tubular bearing 5× for snugly holding the neck of the knob, and thereby provide against its wabbling or having loose play in case the spindle and the knob-socket thereof are not fitted accurately against lost motion. To further increase friction between the nut and the knob, I may interpose at the contact of the knob-neck and nut a washer 6, of paper or similar material. (See Fig. 4.)

Having thus described my invention, what I claim is—

A knob attachment comprising in combination with an apertured member having a conical bearing surrounding the aperture, a square spindle rotatable and slidable in the said aperture, a knob having a neck portion provided with a square-spindle-receiving socket, said neck portion having a beveled bearing edge, a nut for engaging the spindle having a conical bearing-surface for engaging the conical bearing on the apertured member, and having an extension at the opposite end adapted to be clamped into a tight frictional engagement with the beveled portion of the knob-neck whereby to grip the knob and the nut to turn together for the purposes described.

In testimony whereof I have hereunto signed my name to this specification in the presence of two subscribing witnesses.

SILAS FADER.

In presence of—
ROWLAND BRITTAIN,
ELLICE WEBBER.